United States Patent [19]
Ueno et al.

[11] Patent Number: 4,835,629
[45] Date of Patent: May 30, 1989

[54] CODE ERROR CORRECTING CIRCUIT

[75] Inventors: Shoji Ueno, Zama; Yasuhiro Yamada; Yasuo Inoue, both of Yokosuka, all of Japan

[73] Assignee: Victor Company of Japan, Ltd., Japan

[21] Appl. No.: 105,525

[22] Filed: Sep. 29, 1987

[30] Foreign Application Priority Data

Oct. 2, 1986 [JP] Japan ................................ 61-234963

[51] Int. Cl.⁴ ............................................. G11B 5/09
[52] U.S. Cl. ...................................................... 360/53
[58] Field of Search .............................. 360/48, 53, 32; 371/49-51

[56] References Cited

U.S. PATENT DOCUMENTS 4,670,881 6/1987 Imoto .
4,685,004 8/1987 Takahashi et al. ..................... 360/32

FOREIGN PATENT DOCUMENTS 0180764 5/1986 European Pat. Off. .
3511684 10/1985 Fed. Rep. of Germany .

Primary Examiner—Vincent P. Canney
Attorney, Agent, or Firm—Lowe, Price, LeBlanc, Becker & Shur

[57] ABSTRACT

In a rotary-head digital audio tape system, a reproduced digital signal contains audio data, parities P for the audio data, and parities Q for the parities P and the audio data. The reproduced digital signal is sequentially written in a memory. A code error correction circuit reads the digital signal from the memory and performs code error correction of the digital signal by use of the parities P and Q. The code error correction circuit includes a device for, during the code error correction using the parities P, reading the whole of the written digital signal from the memory. The code error correction circuit includes a device for, during code error correction using the parities Q, reading only the audio data and the parities Q corresponding to the audio data from the memory.

2 Claims, 5 Drawing Sheets

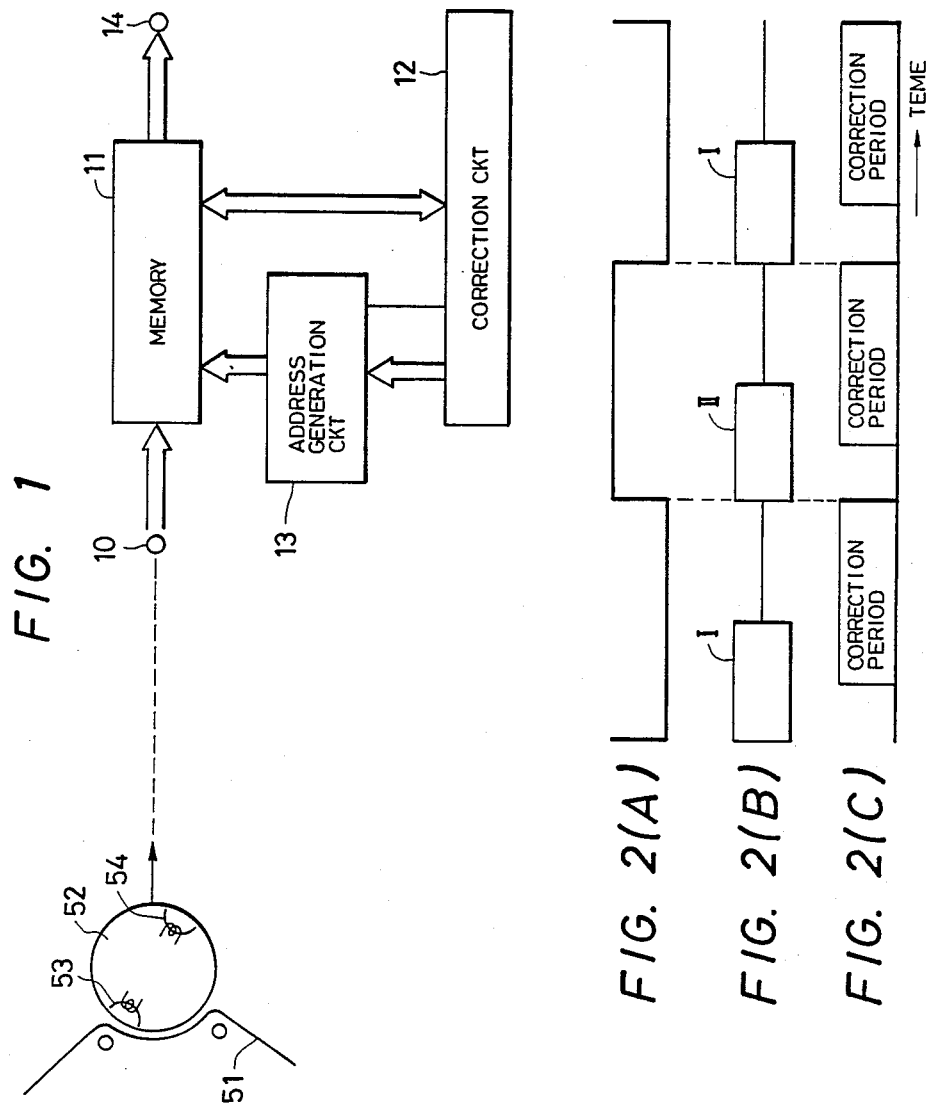

FIG. 6

| BAC | SAC | P | | Q | |
|---|---|---|---|---|---|
| | | PBA | PSA | QBA | QSA |
| 0 | 0 | 0 | 0 | 0 | 0 |
| | 1 | | 2 | 4 | |
| | 2 | 0 | 4 | 8 | |
| | ⋮ | | ⋮ | ⋮ | |
| | 15 | | 30 | 60 | |
| | 16 | | 0 | 64 | |
| | 17 | | 2 | 68 | |
| | 18 | 1 | 4 | 72 | |
| | ⋮ | | ⋮ | ⋮ | |
| | 31 | | 30 | 124 | |
| 1 | 0 | 0 | 1 | 2 | 0 |
| | 1 | | 3 | 6 | |
| | 2 | 0 | 5 | 10 | |
| | ⋮ | | ⋮ | ⋮ | |
| | 15 | | 31 | 62 | |
| | 16 | | 1 | 66 | |
| | 17 | 1 | 3 | 70 | |
| | ⋮ | | ⋮ | ⋮ | |
| | 31 | | 31 | 126 | |
| 2 | 0 | 2 | 0 | 0 | |
| | 1 | | 2 | 4 | |
| | 2 | | 4 | 8 | |
| | ⋮ | | ⋮ | ⋮ | |
| | 15 | | 30 | 60 | |
| | 16 | | 0 | 64 | |
| | 17 | 3 | 2 | 68 | |
| | ⋮ | | ⋮ | ⋮ | |
| | 31 | | 30 | 124 | 1 |
| 3 | 0 | 2 | 1 | 2 | |
| | 1 | | 3 | 6 | |
| | ⋮ | | ⋮ | ⋮ | |
| | 15 | | 31 | 62 | |
| | 16 | | 1 | 66 | |
| | 17 | 3 | 3 | 70 | |
| | ⋮ | | ⋮ | ⋮ | |
| | 31 | | 31 | 126 | |
| 4 | 0 | 4 | 0 | 0 | |
| | 1 | | 2 | 4 | 2 |
| | ⋮ | | ⋮ | ⋮ | |
| 62 | 16 | 63 | 0 | 64 | |
| | 17 | | 2 | 68 | |
| | ⋮ | | ⋮ | ⋮ | |
| | 31 | | 30 | 124 | 31 |
| 63 | 0 | 62 | 1 | 2 | |
| | 1 | | 3 | 6 | |
| | ⋮ | | ⋮ | ⋮ | |
| | 15 | | 31 | 62 | |
| | 16 | | 1 | 66 | |
| | 17 | 63 | 3 | 70 | |
| | ⋮ | | ⋮ | ⋮ | |
| | 31 | | 31 | 126 | |
| 64 | 0 | 64 | 0 | 1 | |
| | 1 | | 2 | 5 | |
| | 2 | | 4 | 9 | |
| | ⋮ | | ⋮ | ⋮ | |
| | 15 | | 30 | | |
| | 16 | 65 | 0 | | |
| | 17 | | 2 | | |
| | ⋮ | | ⋮ | 125 | |
| | 31 | | 30 | | 0 |
| 65 | 0 | 64 | 1 | 3 | |
| | 1 | | 3 | 7 | |
| | 2 | | ⋮ | 11 | |
| | ⋮ | | 31 | ⋮ | |
| | 15 | | 1 | | |
| | 16 | 65 | 3 | | |
| | 17 | | ⋮ | | |
| | ⋮ | | 31 | 127 | |
| | 31 | | | | |

| BAC | SAC | P | | Q | |
|---|---|---|---|---|---|
| | | PBA | PSA | QBA | QSA |
| 66 | 0 | 66 | 0 | 1 | |
| | 1 | | 1 | 5 | |
| | ⋮ | | ⋮ | ⋮ | 1 |
| 110 | 15 | | | | |
| | 16 | | 0 | | |
| | 17 | 111 | 2 | | |
| | ⋮ | | ⋮ | 125 | 23 |
| | 31 | | 30 | | |
| 111 | 0 | 110 | 1 | 3 | |
| | 1 | | 3 | 7 | |
| | ⋮ | | ⋮ | ⋮ | |
| | 15 | | 31 | | |
| | 16 | | 1 | | |
| | 17 | 111 | 3 | | |
| | ⋮ | | ⋮ | | |
| | 31 | | 31 | 127 | |
| 112 | 0 | 112 | 0 | 2 | |
| | 1 | | 2 | ⋮ | |
| | ⋮ | | ⋮ | 30 | |
| | 15 | | 30 | 0 | |
| | 16 | | 0 | 2 | |
| | 17 | 113 | 2 | ⋮ | |
| | ⋮ | | ⋮ | 30 | |
| | 31 | | | | |
| 113 | 0 | 112 | 1 | 3 | |
| | 1 | | 3 | ⋮ | |
| | ⋮ | | ⋮ | 31 | |
| | 15 | | 31 | 1 | |
| | 16 | | 1 | 3 | |
| | 17 | 113 | 3 | ⋮ | |
| | ⋮ | | ⋮ | 31 | |
| | 31 | | | | |
| 114 | 0 | 114 | 0 | 2 | |
| | 1 | | 2 | ⋮ | |
| | ⋮ | | ⋮ | | |
| 125 | 16 | | 1 | 3 | |
| | 17 | 125 | 3 | ⋮ | |
| | ⋮ | | ⋮ | 31 | |
| | 31 | | 31 | | |
| 126 | 0 | 126 | 0 | 2 | |
| | 1 | | 2 | ⋮ | |
| | ⋮ | | ⋮ | 30 | |
| | 15 | | 30 | 0 | |
| | 16 | | 0 | 2 | |
| | 17 | 127 | 2 | ⋮ | |
| | ⋮ | | ⋮ | 30 | |
| | 31 | | | | |
| 127 | 0 | 126 | 1 | 3 | |
| | 1 | | 3 | ⋮ | |
| | ⋮ | | ⋮ | 31 | |
| | 15 | | 31 | 1 | |
| | 16 | | 1 | 3 | |
| | 17 | 127 | 3 | ⋮ | |
| | ⋮ | | ⋮ | 31 | |
| | 31 | | 31 | | |

CODE ERROR CORRECTING CIRCUIT

BACKGROUND OF THE INVENTION

This invention generally relates to a code error correction circuit, and specifically relates to a code error correction circuit usable in a rotary-head digital audio tape system.

Rotary-head digital audio tape (R-DAT) recording and reproducing systems use rotary-heads to record and reproduce digital signals in and from magnetic tapes. The reproduced digital signals undergo error detection and correction processes. In some cases, known code error correction circuits of the R-DAT systems fail to act on portions of audio data.

SUMMARY OF THE INVENTION

It is an object of this invention to provide a reliable code error correction circuit.

A code error correction circuit of this invention is usable in a rotary-head digital audio tape system where a reproduced digital signal contains audio data, parities P for the audio data, and parities Q for the parities P and the audio data. The reproduced digital signal is sequentially written in a memory. The code error correction circuit reads the digital signal from the memory and performs code error correction of the digital signal by use of the parities P and Q. The code error correction circuit includes a device for, during code error correction using the parities P, reading the whole of the written digital signal from the memory. The code error correction circuit includes a device for, during code error correction using the parities Q, reading only the audio data and the parities Q corresponding to the audio data from the memory.

BRIEF DESCRIPTION OF THE DRAWINGS

FIG. 1 is a block diagram of a portion of an R-DAT system including a code error correction circuit according to an embodiment of this invention.

FIG. 2A, B and C is a timing diagram of signals and periods in the code error correction circuit of FIG. 1.

FIG. 6 is a diagram showing the relationship between the inputted values to and the outputted values from the address generation circuit of FIGS. 1 and 5.

DESCRIPTION OF THE PREFERRED EMBODIMENT

Figure 3:
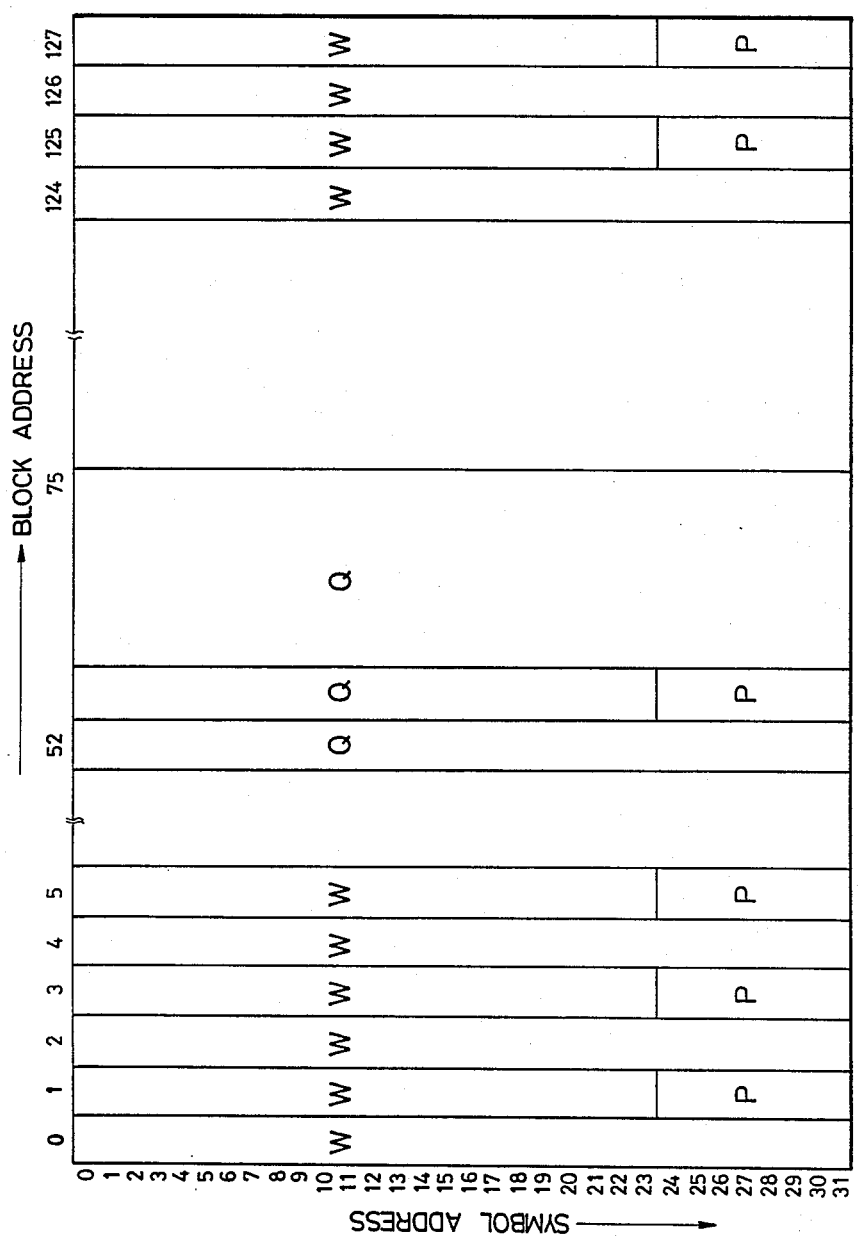
FIG. 3 is a diagram of a reproduced digital signal written in the memory of FIG. 1.

With reference to FIG. 1, an R-DAT system includes a magnetic tape 51 and a rotary drum 52. Two magnetic heads 53 and 54 are mounted on the drum 52 so that they rotate together with the drum 52. The two magnetic heads 53 and 54 are opposed diametrically with respect to the drum 52. Tape 51 is wrapped obliquely around the peripheral surface of the rotary drum 52 over approximately 90 degrees. A known device controls rotation of the drum 52 in accordance with a pulse signal having a wave form as shown by FIG. 2A. For example, the frequency of the drum control pulse signal is approximately 33 Hz. In cases where the drum 52 rotates through 360° during one period of the drum control pulse signal, a reproduced digital signal I (see FIG. 2B) is derived by the first magnetic head 53 from the magnetic tape 51 and also a reproduced digital signal II (see FIG. 2B) is derived by the second magnetic head 54.

The two reproduced digital signals I and II are combined into a single reproduced digital signal which is fed to a terminal 10 via a known circuit (not shown) including a rotary transformer, a head amplifier, and a demodulator. The reproduced digital signal is transmitted from the terminal 10 to a random-access memory 11 and is then written in the memory 11. A component of the digital signal reproduced by the magnetic head 53 or 54 from one track in the magnetic tape 1 has 128 blocks, as shown in FIG. 3 (assuming the block address of 7 bits to be the upper address and the symbol address of 5 bits to be the lower address), which are sequentially written in the memory 11. One signal block consists of 32 symbols. One symbol has 8 bits.

Components of the reproduced digital signal held by respective segments of the memory 11 are sequentially read and transmitted to a correction circuit 12. The digital signal components are subjected to an error correction process in the correction circuit 12 and are then returned to the segments of the memory 11 in a given sequence. The sequential transmissions of digital signal components between the memory 11 and the correction circuit 12 are controlled by an address generation circuit 13. After the error correction process is completed, only components of the reproduced digital signal representing audio data are sequentially read from the memory 11 and are transmitted to a digital-to-analog converter (not shown) via a terminal 14.

As shown in FIG. 3, in regions denoted by block addresses 0-51 and 76-127, all symbols of even blocks and symbols of odd blocks having symbol addresses 0-23 represent audio or sound data W. Symbols of each of odd blocks having symbol addresses 24-31 represent parities (parity check codes) P of Reed-Solomon codes which are generated in accordance with the audio data W of the odd block and the preceding even block. The remaining symbols of block addresses 52-75 represent parities (parity check codes) Q of Reed-Solomon codes which are generated in accordance with the audio data W and the parities P of block addresses 0-51 and 76-127. In the respective symbol addresses, each of the parities Q has been generated from the data of every fourth block address beginning at block address 0, 1, 2, or 3.

The symbols of audio data W and parities P and Q are stored in respective segments of the memory 11 which are denoted in accordance with block addresses (7 bits) and symbol addresses (5 bits, serving as upper (high-order) addresses and lower (low-order) addresses respectively. The reproduced digital signal is read from the memory 11 in unit of symbol to undergo code error correction using parities P and Q.

A correction circuit 12 performs access to the memory 11 and reads respective symbols from the memory 11, correcting code errors in accordance with parities P and then correcting code errors in accordance with parities Q. The correction circuit 12 includes a symbol counter of 5-bit output and a block address counter of 7-bit output to perform access to the memory 11. The block address counter is connected in cascade to a high-order side of the symbol counter. Outputs from the two counters form a 12-bit count signal which is outputted by the correction circuit 12 to an address generation circuit 13. The correction circuit 12 also supplies the address generation circuit 13 with a one-bit switching signal commanding access sequence for code error correction using parities P or parities Q.

At a moment approximately 3.79 msec after the start of tracing or scanning of each track, the correction circuit 12 sets the switching signal to a value "0" which commands the access sequence for code error correction using parities P and also resets the symbol address counter and the block address counter to zero. Then, the two counters count clock pulses occurring at fixed time intervals. When the count value of the block address counter reaches a number corresponding to 128 in decimal base, the correction circuit 12 changes the switching signal to a value "1" which commands the access sequence for code error correction using parities Q and resets the two counters to zero. Then, the two counters recount the fixed-period clock pulses. When the count value of the block address counter on the recounting reaches a number corresponding to 112 in decimal base, the counting operations of the two counters are suspended.

Figure 4:
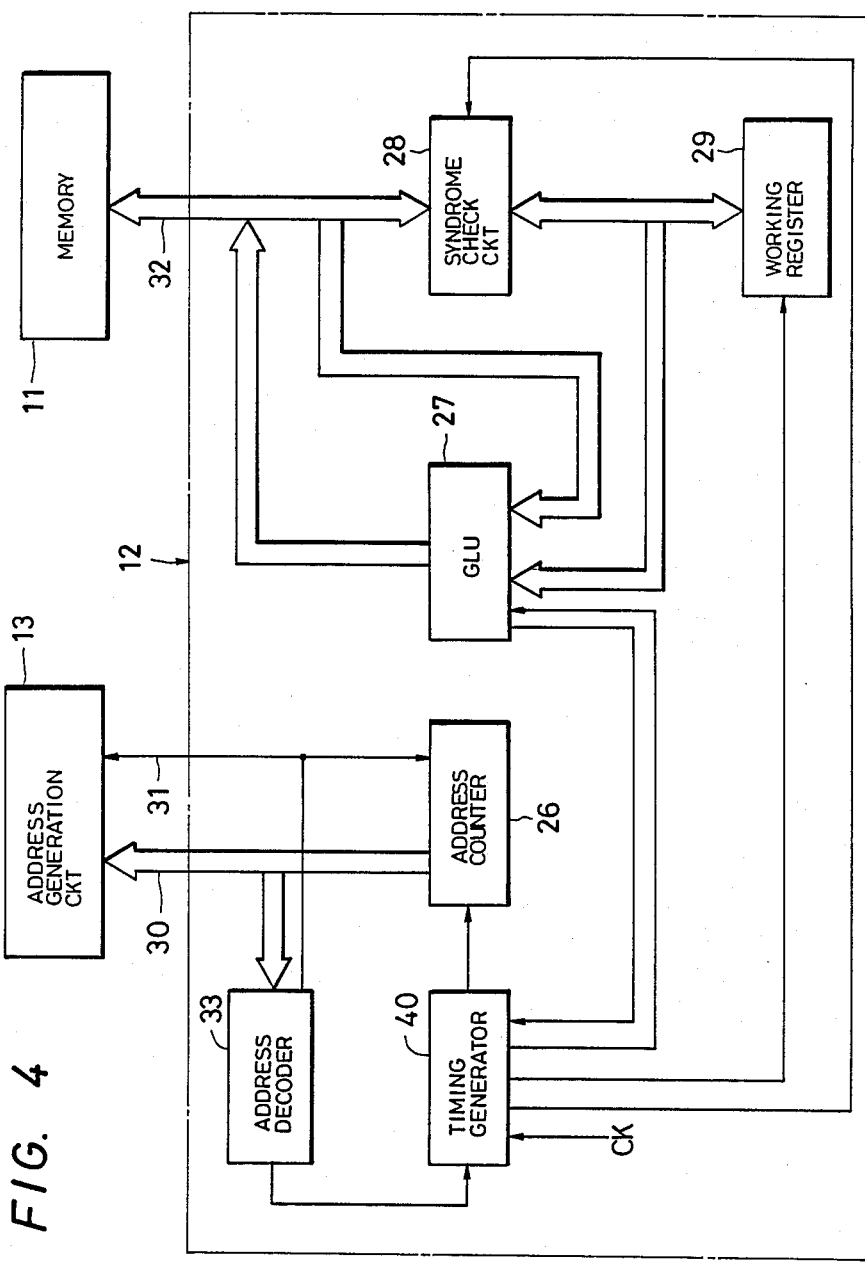
FIG. 4 is a block diagram of the correction circuit of FIG. 1.

As shown in FIG. 4, the correction circuit 12 includes a timing generator 40 receiving fixed-frequency clock pulses and generates various timing signals on the basis of the clock pulses. The timing signals are outputted to an address counter 26, a Galois logical unit (GLU) 27, a syndrome check circuit 28, and a working register 29 respectively. The GLU 27 and the syndrome check circuit 28 are connected to the memory 11 via a data bus 32. The syndrome check circuit 28 performs syndrome calculation with respect to data read from the memory 11 to check whether there are errors in the read data. The GLU 27 performs calculation in Galois field with respect to the data having errors to correct the same if possible. The working register 29 is connected to the GLU 27 and the syndrome check circuit 28 and holds the results of calculations performed by the GLU 27 and the circuit 28. The structures and operations of the GLU 28, the syndrome check circuits 27 and the work register 29 are well known and the further descriptions thereof will be omitted. The address counter 26 and an address decoder 33 are connected to the address generation circuit 13 via an address bus 30 and via a signal line 31. The switching signal is transmitted along the signal line 31. The address counter 26 includes the symbol address counter and the block address counter described previously. The address decoder 33 generates a timing generator control signal in accordance with the output from the address counter 26, and supplies the timing generator control signal to the timing generator 40. When the code correction process is completed, operation of the timing generator 40 is suspended by the timing generator control signal. The timing generator 40 is designed so that each time the drum 52 rotates through 180°, the timing generator 40 is reset.

Figure 5:
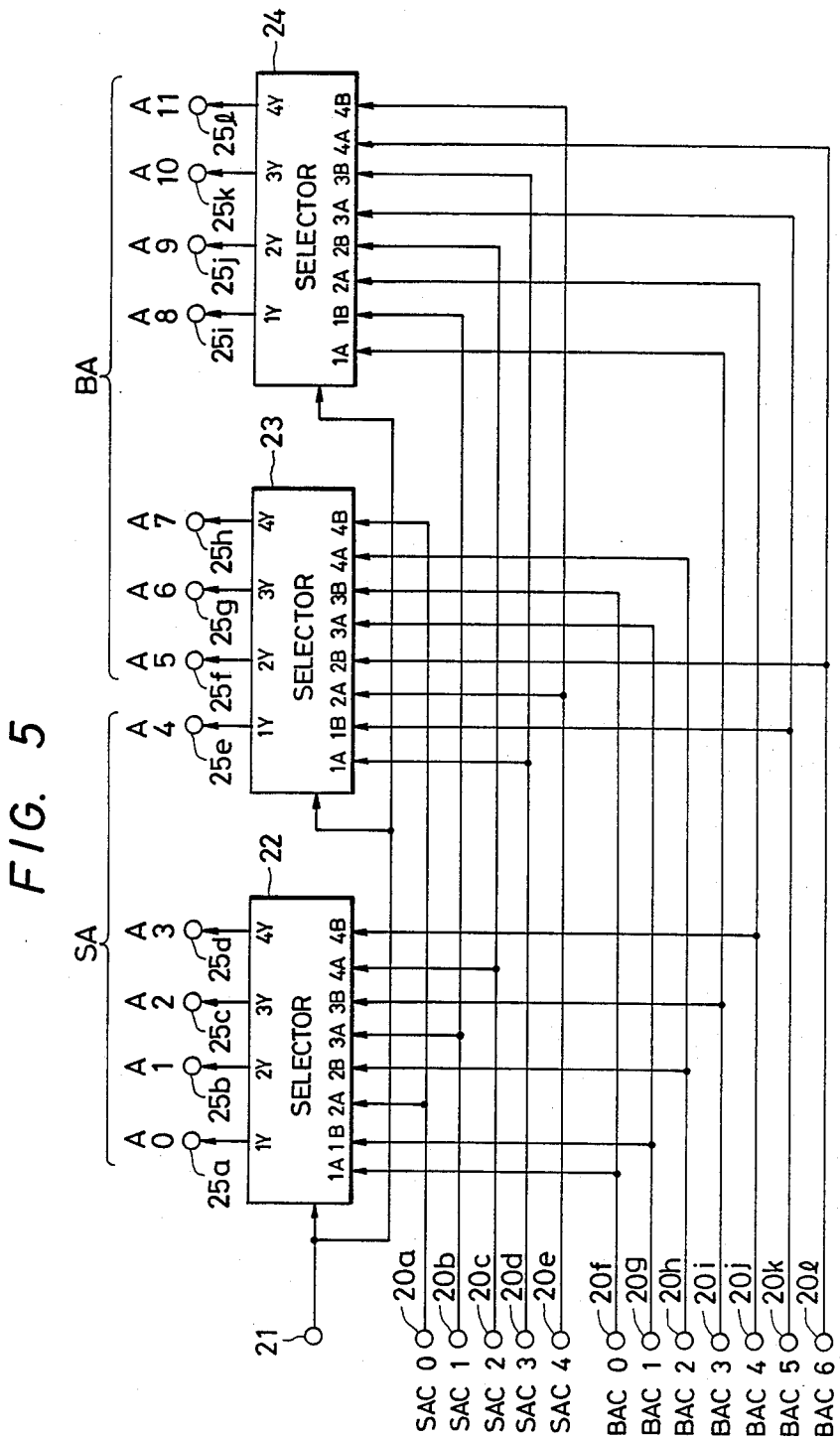
FIG. 5 is a block diagram of the address generation circuit of FIG. 1.

As shown in FIG. 5, the address generation circuit 13 includes terminals 20a–20e subjected to a 5-bit signal representing the count value of the symbol address counter in the correction circuit 12, terminals 20f–20l subjected to a 7-bit signal representing the count value of the block address counter in the correction circuit 12, and a terminal 21 subjected to the switching signal.

The terminal 20a is connected to a terminal 2A of a selector 22 and a terminal 4B of a selector 23. The terminal 20b is connected to a terminal 3A of the selector 22 and a terminal 1B of a selector 24. The terminal 20c is connected to a terminal 4A of the selector 22 and a terminal 2B of the selector 24. The terminal 20d is connected to a terminal 1A of the selector 23 and a terminal 3B of the selector 24. The terminal 20e is connected to a terminal 2A of the selector 23 and a terminal 4B of the selector 24.

The terminal 20f is connected to a terminal 1A of the selector 22 and a terminal 3B of the selector 23. The terminal 20g is connected to a terminal 1B of the selector 22 and a terminal 3A of the selector 23. The terminal 20h is connected to a terminal 2B of the selector 22 and a terminal 4A of the selector 23. The terminal 20i is connected to a terminal 3B of the selector 22 and a terminal 1A of the selector 24. The terminal 20j is connected to a terminal 4B of the selector 22 and a terminal 2A of the selector 24. The terminal 20k is connected to a terminal 1B of the selector 23 and a terminal 3A of the selector 24. The terminal 20l is connected to a terminal 2B of the selector 23 and a terminal 4A of the selector 24.

The terminal 21 is connected to the selectors 22–24. Each of the selectors 22–24 has terminals 1Y, 2Y, 3Y, and 4Y. In each of the selectors 22–24, when the switching signal is "0", signals applied to the terminals 1A, 2A, 3A, and 4A are selected and are outputted via the terminals 1Y, 2Y, 3Y, and 4Y respectively. In addition, when the switching signal is "1", signals applied to the terminals 1B, 2B, 3B, and 4B are selected and are outputted via the terminals 1Y, 2Y, 3Y, and 4Y respectively.

The address generation circuit 13 also includes terminals 25a–25d connected to the terminals 1Y–4Y of the selector 22 respectively, terminals 25e–25h connected to the terminals 1Y–4Y of the selector 23 respectively, and terminals 25i–25l connected to the terminals 1Y–4Y of the selector 24 respectively. The terminals 25a–25l are connected to address lines of the memory 11 in such a manner that the terminal 25a corresponds to the least significant bit (LSB) and the terminal 25l corresponds to the most significant bit (MSB). Accordingly, a 5-bit signal outputted via the terminals 25a–25e represents a symbol address (see FIG. 3). In addition, a 7-bit signal outputted via the terminals 25f–25l represents a block address (see FIG. 3).

In cases where the count value of the block address counter and the count value of the symbol address counter vary as shown by columns BAC and SAC of FIG. 6 respectively, when the switching signal is "0" and thus code error correction using parities P is performed, a block address and a symbol address for providing access to the memory 11 vary as shown by columns PBA and PSA of FIG. 6 respectively. In the same cases, when the switching signal is "1" and thus code error correction using parities Q is performed, a block address and a symbol address for providing access to the memory 11 vary as shown by columns QBA and QSA of FIG. 6 respectively. It should be noted that the numbers of FIG. 6 are denoted in decimal base.

As understood from FIG. 6, during code error correction using parities P, symbol address PSA is incremented by an increment of two, and block address PBA is imcremented by an increment of one, repreating every two block addresses twice.

During code error correction using parities Q, block address QBA is incremented from 0, 2, 1, or 3 by an increment of four. While the value of the block address counter (BAC) is less than or equal to 63, the initial value of the block address QBA changes cyclically as: 0-2-0-2-. . . , whereas the symbol address varies QSA from 0 to 31 by an increment of one. While the value of the block address counter (BAC) is from 64 to 111 (both) inclusive, the initial value of the block address QBA changes cyclically as: 1-3-1-3-..., whereas the symbol address varies from 0 to 23 by an increment of one. In the latter case, as understood from FIG. 3, symbols in the regions of blocks of odd addresses which are denoted by symbol addresses equal to or greater than 24 are not read from the memory 11 so that code error correction of symbols of parities P by use of the parities Q is prevented. During the code error correction using the parities Q, only the audio data W and the parities Q corresponding to the audio data W are read from the memory 11 and are then subjected to the error correction process in the correction circuit 12.

The reason, why the count value of the block address counter does not exceed 111 (i.e., the count value of the symbol address QSA does not exceed 23) while the block address QBA begins at 1 and 3, and reaches 127 while the error correction using the parities P is performed, is as follows. When the address decoder 33 in the correction circuit 12 detects that the count value of the block address counter in the address counter 26 reaches 112 while the switching signal assumes "0" (i.e., the error correction using the parities Q is performed), the address decoder 33 resets the address counter 26 and suspends its operation. On the other hand, while the switching signal assumes a "1" value (i.e., while the error correction using the parities P is performed), the decoder 33 does not detect the count value 112 but detects the count value 128 of the block address counter, and outputs a reset pulse for the address counter 26 at that moment together with changing the value of the switching signal to "1".

Since only the audio data are read from the memory 11 and are fed to the analog-to-digital converter via the terminal 14 after the error correction process is completed, the omission of error correction of symbols of parities P induces no problems in the accuracy of audio data reproduction. The omission of error correction of symbols of parities P can reduce a time necessary to read symbols from the memory 11, thereby shortening a time necessary for code error correction of one track data. Accordingly, during a correction period (see C of FIG. 2) approximately equal to 5.68 msec, all audio data in one track can be subjected to code error correction process.

What is claimed is:

1. In a rotary-head digital audio tape system wherein a reproduced digital signal contains audio data, parities P, parities Q, the reproduced digital signal being sequentially written in memory, a code error correction circuit for reading the digital signal from the memory and performing code error correction of the signal by use of the parities P and Q, the code error correction circuit comprising:

(a) first means for, during a code error correction using the parities P, reading the whole of the written digital signal from the memory;
   (b) second means for, during the code error correction using the parities P, performing code error correction of the whole of the digital signal, read from the memory and providing a corrected digital signal;
   (c) third means for, during the code error correction using the parities P, writing the corrected digital signal into the memory;
   (d) fourth means for, during a code error correction using the parities Q following the code error correction using the parities P, reading the audio data and the parities Q corresponding to the audio data from the memory without reading the P parities;
   (e) fifth means for, during the code error correction using the parities Q, performing error correction of the audio data and of the parities Q read by said fourth means while avoiding error correction of the parities P thereby and providing corrected audio data and corrected parities Q, to save time spent in the error correction; and
   (f) sixth means for, during the code error correction using the parities Q, writing the corrected audio data and the corrected parities Q into the memory.

2. The code error correction circuit of claim 1 wherein said first and fourth means are composed of an address generation circuit.

* * * * *